US012785791B2

(12) United States Patent
Kang et al.

(10) Patent No.: US 12,785,791 B2
(45) Date of Patent: Nov. 3, 2026

(54) ELECTRONIC DEVICE AND METHOD FOR COMPENSATING DOPPLER SHIFT IN NON-TERRESTRIAL NETWORK

(71) Applicant: THINKWARE CORPORATION, Seongnam-si (KR)

(72) Inventors: Jeoungkyu Kang, Seongnam-si (KR); Daewon Kim, Seongnam-si (KR); Taekyu Han, Seongnam-si (KR)

(73) Assignee: THINKWARE CORPORATION, Seongnam-si (KR)

(*) Notice: Subject to any disclaimer, the term of this patent is extended or adjusted under 35 U.S.C. 154(b) by 366 days.

(21) Appl. No.: 18/384,200

(22) Filed: Oct. 26, 2023

(65) Prior Publication Data

US 2024/0146401 A1 May 2, 2024

(30) Foreign Application Priority Data

Oct. 27, 2022 (KR) ........................ 10-2022-0140764

(51) Int. Cl.

| | |
|---|---|
| ***H04W 24/02*** | (2009.01) |
| ***H04B 7/185*** | (2006.01) |
| *H04B 7/01* | (2006.01) |

(52) U.S. Cl.

CPC ........... *H04B 7/18513* (2013.01); *H04B 7/01* (2013.01)

(58) Field of Classification Search

CPC ... H04B 7/01; H04B 7/18513; H04W 56/001; H04W 56/0015; H04W 72/0446; H04W 72/231; H04W 56/0045; H04W 76/20; H04W 84/06

See application file for complete search history.

(56) References Cited

U.S. PATENT DOCUMENTS

2024/0129867 A1* 4/2024 Ma ..................... H04B 7/18513

OTHER PUBLICATIONS

Extended European Search Report dated Mar. 13, 2024, issued in counterpart European Patent Application No. 23206160.6 (8 pages).

Thales, "FL Summary on enhancements on UL time and frequency synchronization for NR NTN", 3GPP TSG-RAN WG1 Meeting #105-e, May 10-27, 2021 (96 pages).

* cited by examiner

*Primary Examiner* — Phuoc H Doan

(74) *Attorney, Agent, or Firm* — WHDA, LLP

(57) ABSTRACT

A device of a user equipment (UE) includes at least one transceiver and at least one processor coupled to the at least one transceiver. The at least one processor is configured to perform a compensation for doppler shift based on ephemeris information for non-terrestrial network (NTN) device and position information of the UE. The at least one processor is configured to transmit a message including compensation information to a network node through the NTN device based on the compensation. The compensation information indicates at least one of a frequency shift value according to the doppler shift or a doppler shift change rate indicating a change rate of a frequency shift value per unit time. The NTN device includes a satellite that moves based on the ephemeris information.

16 Claims, 14 Drawing Sheets

ELECTRONIC DEVICE AND METHOD FOR COMPENSATING DOPPLER SHIFT IN NON-TERRESTRIAL NETWORK

CROSS-REFERENCE TO RELATED APPLICATION(S)

This application is based on and claims priority under 35 U.S.C. § 119 to Korean Patent Application No. 10-2022-0140764, filed on Oct. 27, 2022, in the Korean Intellectual Property Office, the disclosure of which is incorporated by reference herein in its entirety.

BACKGROUND

Technical Field

The present disclosure generally relates to a non-terrestrial network (NTN), and more specifically, to an electronic device and a method for compensating Doppler shift in the non-terrestrial network.

Description of Related Art

A non-terrestrial network (NTN) has been introduced to complement a terrestrial network that provides a wireless communication system. The non-terrestrial network may provide a communication service even in areas where construction of the terrestrial network is difficult or in disaster situations. In addition, an access network environment may be provided efficiently due to the recent decrease in satellite launch costs.

SUMMARY

In embodiments, a method performed by a user equipment (UE) may comprise performing a compensation for doppler shift based on ephemeris information for non-terrestrial network (NTN) device and position information of the UE. The method may comprise transmitting a message including compensation information to a network node through the NTN device based on the compensation. The compensation information may indicate at least one of a frequency shift value according to the doppler shift or a doppler shift change rate indicating a change rate of a frequency shift value per unit time. The NTN device may comprise a satellite that moves based on the ephemeris information.

In embodiments, a method performed by a network node may comprise receiving, from a non-terrestrial network (NTN) device through a user equipment (UE), a message including compensation information for doppler shift. The method may comprise identifying at least one of a frequency shift value according to the doppler shift or a doppler shift change rate indicating a change rate of a frequency shift value per unit time, from the compensation information. The compensation information may be associated with ephemeris information for the non-terrestrial network (NTN) device and position information of the UE.

In embodiments, a device of a user equipment (UE) may comprise at least one transceiver and at least one processor coupled to the at least one transceiver. The at least one processor may be configured to perform a compensation for doppler shift based on ephemeris information for non-terrestrial network (NTN) device and position information of the UE. The at least one processor may be configured to transmit a message including compensation information to a network node through the NTN device based on the compensation. The compensation information may indicate at least one of a frequency shift value according to the doppler shift or a doppler shift change rate indicating a change rate of a frequency shift value per unit time. The NTN device may comprise a satellite that moves based on the ephemeris information.

In embodiments, a device of a network node may comprise at least one transceiver and at least one processor coupled to the at least one transceiver. The at least one processor may be configured to receive, from a non-terrestrial network (NTN) device through a user equipment (UE), a message including compensation information for doppler shift. The at least one processor may be configured to identify at least one of a frequency shift value according to the doppler shift or a doppler shift change rate indicating a change rate of a frequency shift value per unit time, from the compensation information. The compensation information may be associated with ephemeris information for the non-terrestrial network (NTN) device and position information of the UE.

DETAILED DESCRIPTION

Figure 1:
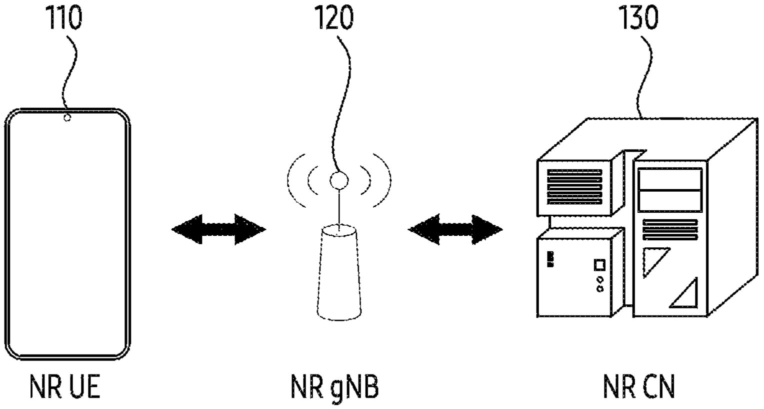
FIG. 1 illustrates a wireless communication system according to embodiments.

Terms used in the present disclosure are used only to describe a specific embodiment and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure cannot be interpreted to exclude embodiments of the present disclosure.

In various embodiments of the present disclosure described below, a hardware approach is described as an example. However, since the various embodiments of the present disclosure include technology that use both hardware and software, the various embodiments of the present disclosure do not exclude a software-based approach.

A term referring to a signal (e.g., signal, information, message, signaling), a term referring to resource (e.g., symbol, slot, subframe, radio frame, subcarrier, resource element (RE), resource block (RB), bandwidth part (BWP), occasion), a term for operation state (e.g., step, operation, procedure), a term referring to data (e.g., packet, user stream, information, bit, symbol, codeword), a term referring to a channel, a term referring to network entities, a term referring to a component of an apparatus, and the like used in the following description are illustrated for convenience of description. Accordingly, the present disclosure is not limited to terms described below, and another term having an equivalent technical meaning may be used.

In the following description, a physical channel and a signal may be used interchangeably with data or a control signal. For example, a physical downlink shared channel (PDSCH) is a term referring to a physical channel through which data is transmitted, but the PDSCH may also be used to refer to data. In other words, in the present disclosure, the expression 'transmitting a physical channel' may be interpreted as equivalent to the expression 'transmitting data or a signal through a physical channel'.

Hereinafter, in the present disclosure, higher signaling refers to a signal transmission method transmitted from a base station to a terminal using a downlink data channel of a physical layer or from the terminal to the base station using a uplink data channel of the physical layer. Higher signaling may be understood as radio resource control (RRC) signaling or MAC control element (hereinafter, 'CE').

In addition, in the present disclosure, in order to determine whether a specific condition is satisfied or fulfilled, an expression of more than or less than may be used, but this is only a description for expressing an example and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

Although the present disclosure describes various embodiments using terms used in some communication standards (e.g., 3rd Generation Partnership Project (3GPP), European Telecommunications Standards Institute (ETSI), extensible radio access network (xRAN), and open-radio access network (O-RAN)), it is only an example for explanation. Various embodiments of the present disclosure may be easily modified and be applied to other communication.

FIG. 1 illustrates a wireless communication system according to embodiments.

Referring to FIG. 1, FIG. 1 illustrates a terminal 110 and a base station 120 as a part of nodes using a wireless channel in a wireless communication system. FIG. 1 illustrates only one base station, but the wireless communication system may further include another base station identical or similar to the base station 120.

The terminal 110 is a device used by a user and performs communication with the terminal 110 through a wireless channel. A link from the base station 120 to the terminal 110 is referred to as downlink (DL), and a link from the terminal 120 to the base station 120 is referred to as uplink (UL). In addition, although not illustrated in FIG. 1, the terminal 110 and another terminal may perform communication through a mutual radio channel. In this case, a device-to-device link (D2D) between the terminal 110 and the other terminal is referred to as a sidelink, and the sidelink may be used interchangeably with a PC5 interface. In some other embodiments, the terminal 110 may be operated without user involvement. According to an embodiment, the terminal 110 is a device that performs machine type communication (MTC) and may not be carried by a user. In addition, according to an embodiment, the terminal 110 may be a narrowband (NB)-internet of things (IoT) device.

The terminal 110 may be referred to as 'user equipment (UE)', 'vehicle', 'customer premises equipment (CPE), 'mobile station', 'subscriber station', 'remote terminal', 'wireless terminal', 'electronic device', 'user device' or another term with equivalent technical meaning, in addition to terminal.

The base station 120 is a network infrastructure that provides wireless access to the terminal 110. The terminal 110 has a coverage defined based on a distance at which a signal may be transmitted. The terminal 110 may be referred to as 'access point (AP)', 'eNodeB (eNB)', '5th generation node', 'next generation nodeB (gNB)', 'transmission/reception point (TRP)' or another term with equivalent technical meaning, in addition to the base station.

The base station 120 may communicate with a core network entity 130. For example, the core network entity 130 may include an access and management function (AMF). In addition, for example, the core network entity 130 may include a user plane function (UPF).

The terminal 110 may perform beamforming with the base station 120. The terminal 110 and the base station 120 may transmit and receive a radio signal in a relatively low frequency band (e.g., frequency range 1 (FR 1) of NR). In addition, the terminal 110 and the base station 120 may transmit and receive a radio signal in a relatively high frequency band (e.g., FR 2 (or FR 2-1, FR 2-2, FR 2-3), FR 3 of NR), and a mmWave band (e.g., 28 GHz, 30 GHz, 38 GHz, 60 GHz). In order to improve a channel gain, the terminal 110 and the base station 120 may perform beamforming. Herein, the beamforming may include transmission beamforming and reception beamforming. The terminal 110 and the base station 120 may assign directivity to the transmission signal or the reception signal. To this end, the terminal 110 and the base station 120 may select serving beams through a beam search or a beam management procedure. After the serving beams are selected, subsequent communication may be performed through a resource in a QCL relationship with a resource used to transmit or receive signals of the serving beams.

If large-scale characteristics of a channel delivering a symbol on a first antenna port may be inferred from a channel delivering a symbol on a second antenna port, the first antenna port and the second antenna port may be evaluated as being in a QCL relationship. For example, the large-scale characteristics may include at least one of delay spread, doppler spread, doppler shift, average gain, average delay, or spatial receiver parameter.

Both the terminal 110 and the base station 120 may perform beamforming, but embodiments of the present disclosure are not limited thereto. In some embodiments, the terminal 110 may or may not perform beamforming. In addition, the base station 120 may or may not perform beamforming. In other words, only one of the terminal 110 and the base station 120 may perform beamforming, or neither the terminal 110 nor the base station 120 may perform beamforming.

In the present disclosure, a beam refers to a spatial flow of a signal in a wireless channel, and is formed by one or more antennas (or antenna elements), and this formation process may be referred to as beamforming. The beamforming may include at least one of analog beamforming or digital beamforming (e.g., precoding). A reference signal transmitted based on beamforming may include, for example, a demodulation-reference signal (DM-RS), a channel state information-reference signal (CSI-RS), a synchronization signal/physical broadcast channel (SS/PBCH), and a sounding reference signal (SRS). In addition, IE such as CSI-RS resource or SRS-resource may be used as a configuration for each reference signal, and the configuration may include information associated with the beam. The information associated with the beam may mean whether the configuration (e.g., CSI-RS resource) uses the same spatial domain filter or a different spatial domain filter with as another configuration (e.g., another CSI-RS resource in the same CSI-RS resource set) or mean which reference signal is quasi-co-located (QCL), or mean what type (e.g., QCL type A, B, C, D) if it is QCL.

Hereinafter, in order to describe embodiments, the terminal may be referred to as a UE 110 and the base station may be referred to as a gNB 120.

Figure 2:
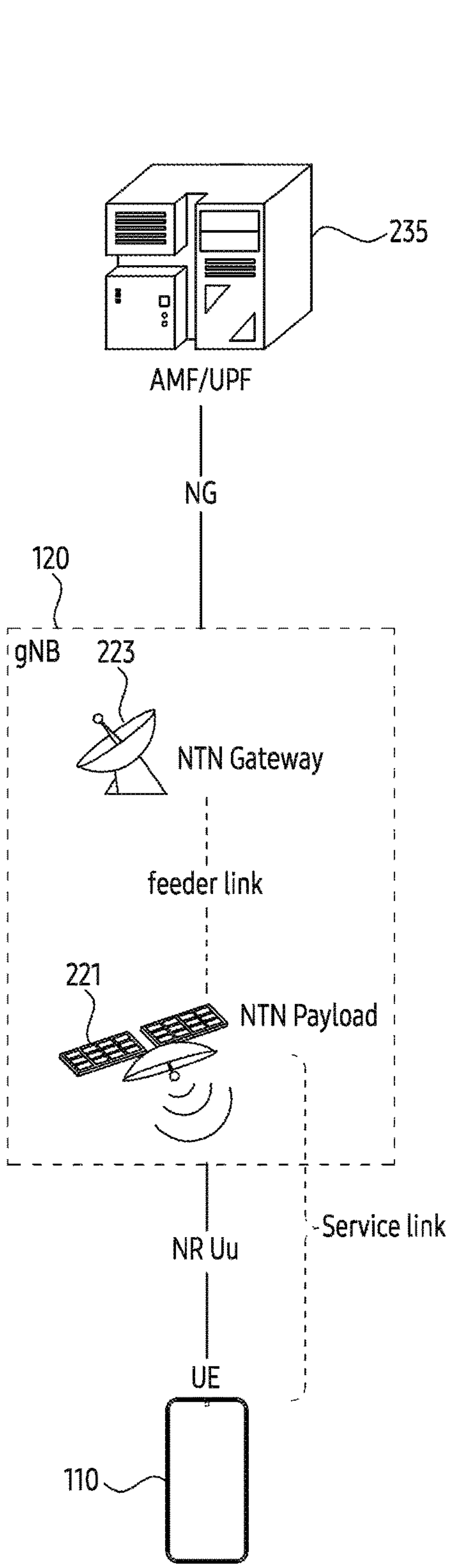
FIG. 2 illustrates an example of a non-terrestrial network (NTN) according to embodiments.

FIG. 2 illustrates an example of a non-terrestrial network (NTN) according to embodiments. The NTN refers to an NG-RAN that provides non-terrestrial NR access to UE (e.g., the UE 110) through NTN payload and NTN gateway mounted on NTN vehicle based on airborne or space-borne. The NG-RAN may include one or more gNBs (e.g., the gNB 120).

Referring to FIG. 2, the NTN 200 may include an NTN payload 221 and an NTN gateway 223 as the gNB 120. The NTN payload 221 is a network node mounted on a high altitude platform station (HAPS) or a satellite that provides a connection function between a service link (described later) and a feeder link (described later). The NTN gateway 223 is an earth station disposed on a surface of the earth that provides a connection to the NTN payload 221 by using the feeder link. The NTN gateway 223 is a transport network layer (TNL) node. The NTN 200 may provide non-terrestrial NR access to the UE 110. The NTN 200 may provide non-terrestrial NR access to the UE 110 through the NTN payload 221 and the NTN gateway 223. A link between the NTN payload 221 and the UE 110 may be referred to as a service link. A link between the NTN gateway 223 and the UE 110 may be referred to as a feeder link. The feeder link may correspond to a wireless link.

The NTN payload 221 may receive wireless protocol data from the UE 110 through the service link. The NTN payload 221 may transparently transmit the wireless protocol data to the NTN gateway 223 through the feeder link. Therefore, the NTN payload 221 and the NTN gateway 223 may be considered as one gNB 120 from perspective of the UE 110. The NTN payload 221 and the NTN gateway 223 may communicate with the UE 110 through a Uu interface, which is a general wireless protocol. In other words, the NTN payload 221 and the NTN gateway 223 may perform wireless protocol communication with the UE 110, such as one gNB 120. The NTN gateway 223 may communicate with a core network entity 235 (AMF or UPF) through an NG interface.

According to an embodiment, the NTN payload 221 and the NTN gateway 223 may use a wireless protocol stack in a control plane of FIG. 3A to be described later. In addition, according to an embodiment, the NTN payload 221 and the NTN gateway 223 may use a wireless protocol stacks in a user plane of FIG. 3B.

In FIG. 2, one NTN payload 221 and one NTN gateway 223 included in the gNB 120 are described, but the embodiments of the present disclosure are not limited thereto. For example, the gNB may include a plurality of NTN payloads. In addition, for example, the NTN payload may be provided by a plurality of gNBs. In other words, an implementation scenario illustrated in FIG. 2 is an example and does not limit embodiments of the present disclosure.

Figure 3A:
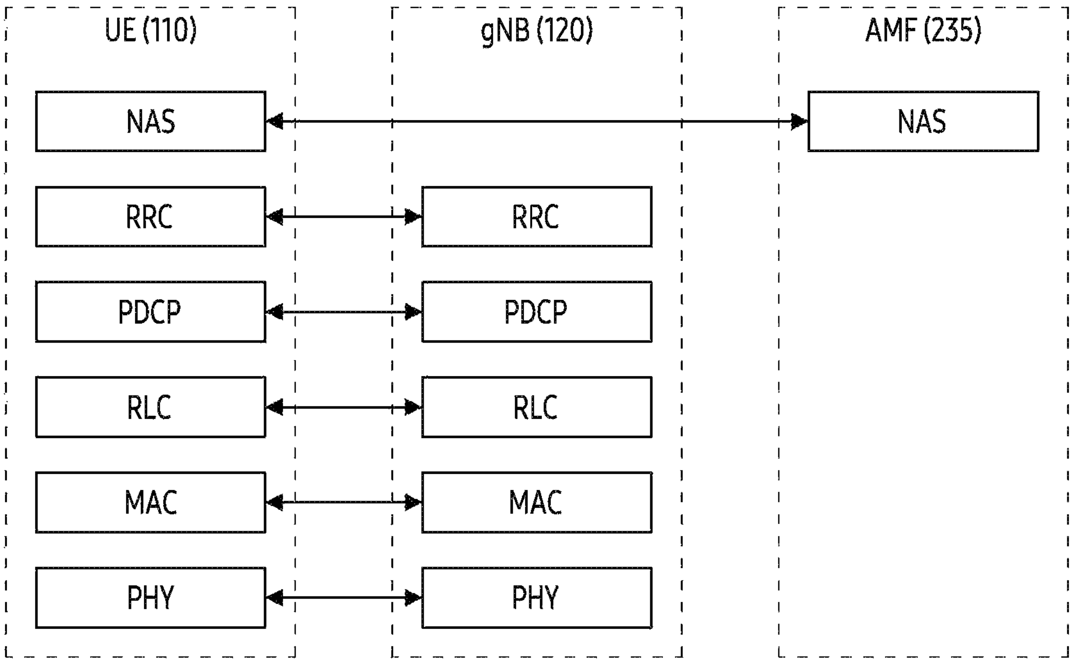
FIG. 3A illustrates an example of a control plane (C-plane) according to embodiments.

FIG. 3A illustrates an example of a control plane (C-plane) according to embodiments. An NTN payload (e.g., the NTN payload 221) and an NTN gateway (e.g., the NTN gateway 223) may function as gNB (e.g., the gNB 120). Hereinafter, the protocol by the NTN payload and the NTN gateway may be understood as an operation of the gNB 120.

Referring to FIG. 3A, in the C-plane, the UE 110 and an AMF 235 may perform non-access stratum (NAS) signaling. In the C-plane, the UE 110 and the gNB 120 may perform communication according to a protocol designated in each of an RRC layer, a PDCP layer, an RLC layer, a MAC layer, and a PHY layer.

In NTN access, a main function of the RRC layer may include at least a part of the following functions.

- Broadcast system information associated with access stratum (AS) and NAS
- Paging initiated by 5G core (5GC) or next generation-radio access network (NG-RAN)
- Establishment, maintenance and release of RRC connection between UE and NG-RAN including:
  - Add, modify, and release carrier aggregation
  - Add, modify, and release dual connectivity between NR or E-UTRA and NR
- Security function including key management;
- Set up, configuration, maintenance management, and release of Signaling Radio Bearer (SRB) and Data Radio Bearer (DRB)
- Move function including:
  - Handover and context transfer;
  - Control of UE cell selection and reselection and cell selection and reselection;
  - Mobility between RATs
- Quality of service (QoS) management function;
- UE measurement report and control of report;
- Radio link failure detection and recovery
- Message transmission from UE to NAS or from NAS to UE In NTN access, a main function of the PDCP layer may include at least a part of the following functions.

- Header compression and decompression: ROHC only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink In NTN access, a main function of the RLC layer may include at least a part of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In NTN access, the MAC layer may be connected to a plurality of RLC layer devices configured on a terminal, and a main function of the MAC may include at least a part of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding In NTN access, the physical layer may include channel coding and modulating higher layer data, making into an OFDM symbol, and transmitting to a wireless channel, or demodulating the OFDM symbol received through a wireless channel, channel decoding, and transmitting to a higher layer.

Figure 3B:
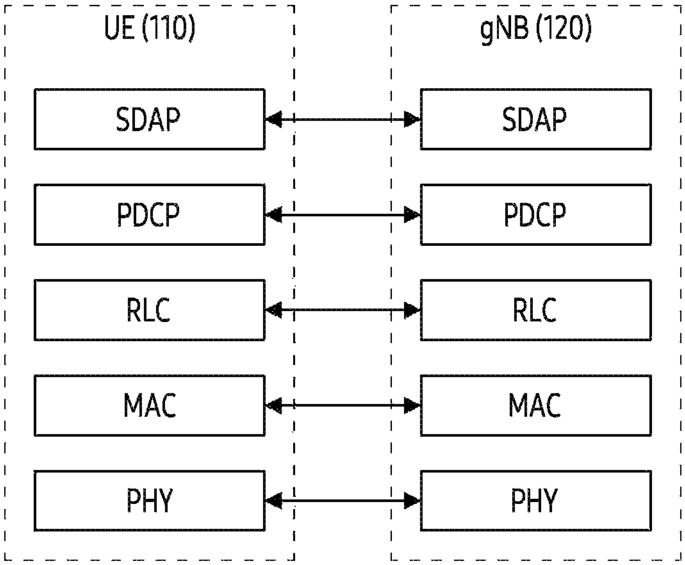
FIG. 3B illustrates an example of a user plane (U-plane) according to embodiments.

FIG. 3B illustrates an example of a user plane (U-plane) according to embodiments. An NTN payload (e.g., the NTN payload 221) and an NTN gateway (e.g., the NTN gateway 223) may function as gNB (e.g., the gNB 120). Hereinafter, a protocol by the NTN payload and the NTN gateway may be understood as an operation of the gNB 120.

Referring to FIG. 3B, in the U-plane, the UE 110 and the gNB 120 may perform communication according to a protocol designated in each of an SDAP layer, a PDCP layer, an RLC layer, a MAC layer, and a PHY layer. For the PDCP layer, the RLC layer, the MAC layer, and the PHY layer, except for the SDAP layer, the description of FIG. 3A may be referenced.

In NTN access, the SDAP layer may provide a QoS flow of 5GC. A single protocol entity of the SDAP may be configured for each individual PDU session, and a function of the SDAP layer may include at least a part of the following functions.

Figure 4:
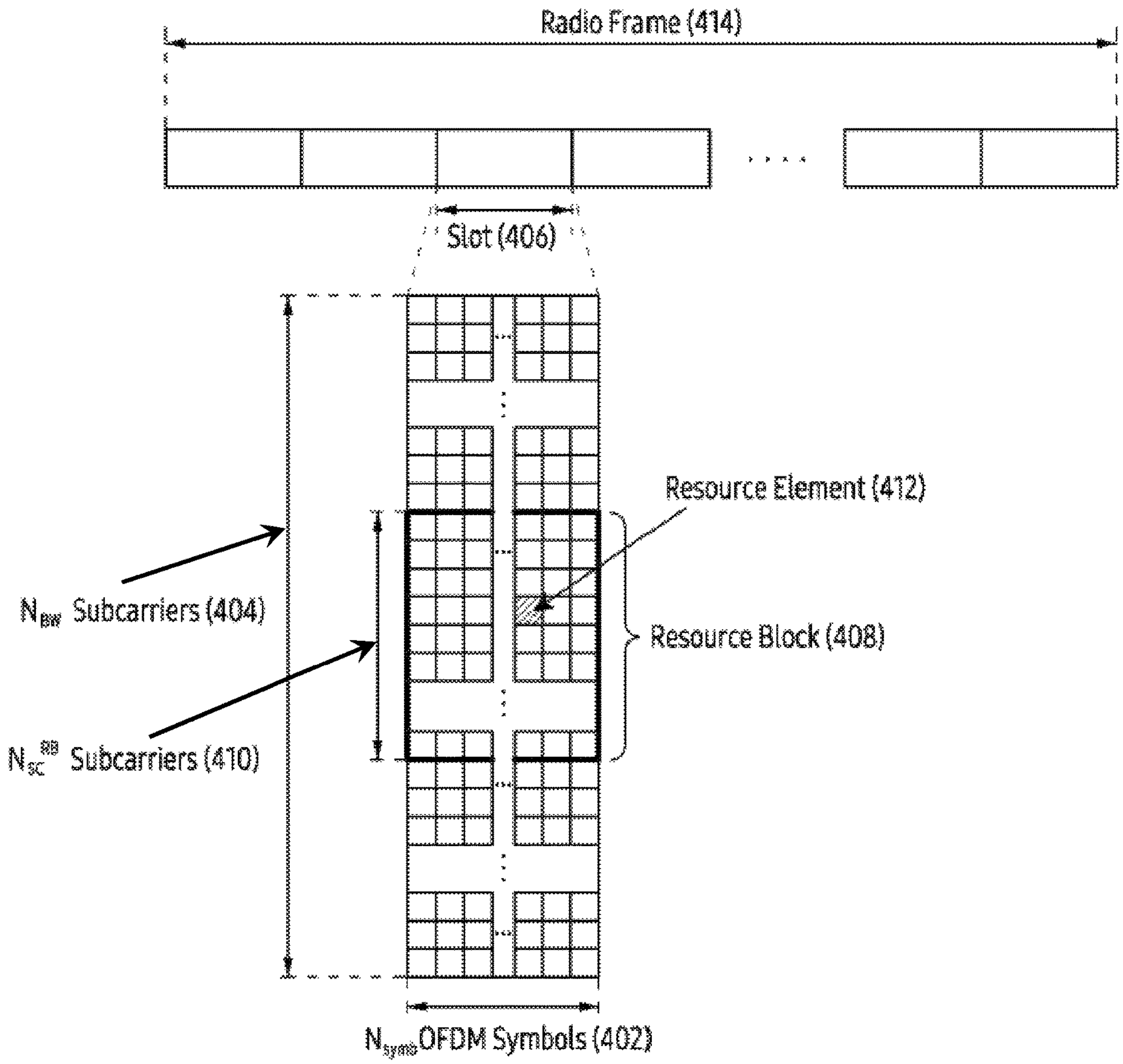
FIG. 4 illustrates an example of a resource structure in a time-frequency domain, in a wireless communication system according to embodiments.

Mapping between QoS flow and Data radio bearer;
Displaying a QoS flow identifier (ID) (QFI), in both DL and UL packet FIG. 4 illustrates an example of a resource structure in a time-frequency domain, in a wireless communication system according to embodiments. FIG. 4 illustrates a basic structure of a time-frequency domain, which is a radio resource area in which data or a control channel is transmitted in a downlink or uplink.

Referring to FIG. 4, a horizontal axis indicates a time domain and a vertical axis indicates a frequency domain. A minimum transmission unit in the time domain is an OFDM symbol, and $N_{symb}$ OFDM symbols 402 are gathered to form one slot 406. A length of a subframe is defined as 1.0 ms, and a length of a radio frame 414 is defined as 10 ms. A minimum transmission unit in the frequency domain is a subcarrier, and a carrier bandwidth configuring a resource grid is configured with $N_{BW}$ subcarriers 404.

In the time-frequency domain, a basic unit of resources is a resource element (hereinafter, 'RE') 412, which may be represented as an OFDM symbol index and a subcarrier index. A resource block may include a plurality of resource elements. In an LTE system, the resource block (RB) (or physical resource block (hereinafter, 'PRB') is defined as $N_{symb}$ consecutive OFDM symbols in the time domain and $N_{SC}^{RB}$ consecutive subcarriers in the frequency domain. In an NR system, the RB 408 may be defined as $N_{SC}^{RB}$ consecutive subcarriers 410 in the frequency domain. One RB 408 includes $N_{SC}^{RB}$ REs 412 on the frequency axis. In general, a minimum transmission unit of data is RB, and a number of subcarriers is $N_{SC}^{RB}=12$. The frequency domain may include common resource blocks (CRBs). The PRB may be defined in a bandwidth part (BWP) in the frequency domain. The CRB and PRB numbers may be determined according to subcarrier spacing. A data rate may increase in proportion to a number of RBs scheduled for the terminal.

In the NR system, a downlink transmission bandwidth and an uplink transmission bandwidth may be different, in case of a frequency division duplex (FDD) system that operates by dividing downlink and uplink by frequency. A channel bandwidth indicates a radio frequency (RF) bandwidth corresponding to a system transmission bandwidth. Table 1 shows a part of a correspondence between the system transmission bandwidth, subcarrier spacing (SCS) and channel bandwidth defined in the NR system in a frequency band (e.g., a frequency range (FR) 1 (410 MHz to 7,125 MHz)) lower than x GHz. And Table 2 shows a part of a correspondence relationships between a transmission bandwidth, subcarrier spacing, and channel bandwidth defined in the NR system in a frequency band (e.g., FR2 (24,550 MHz-52,600 MHz) or FR2-2 (52,600 MHz to 71,000 MHz)) higher than yGHz. For example, in an NR system having a 100 MHz channel bandwidth at 30 kHz subcarrier spacings, a transmission bandwidth is configured with 273 of RBs. In Table 1 and Table 2, N/A may be a bandwidth-subcarrier combination that is not supported by the NR system.

TABLE 1

| channel bandwidth [MHz] | SCS | 5 | 10 | 20 | 50 | 80 | 100 |
|---|---|---|---|---|---|---|---|
| transmission bandwidth | 15 kHz | 25 | 52 | 106 | 207 | N/A | N/A |
| configuration | 30 kHz | 11 | 24 | 51 | 133 | 217 | 273 |
| $N_{RB}$ | 60 kHz | N/A | 11 | 24 | 65 | 107 | 135 |

TABLE 2

| channel bandwidth [MHz] | SCS | 50 | 100 | 200 | 400 |
|---|---|---|---|---|---|
| transmission bandwidth | 60 kHz | 66 | 132 | 264 | N/A |
| configuration $N_{RB}$ | 120 kHz | 32 | 66 | 132 | 264 |

Figure 5:
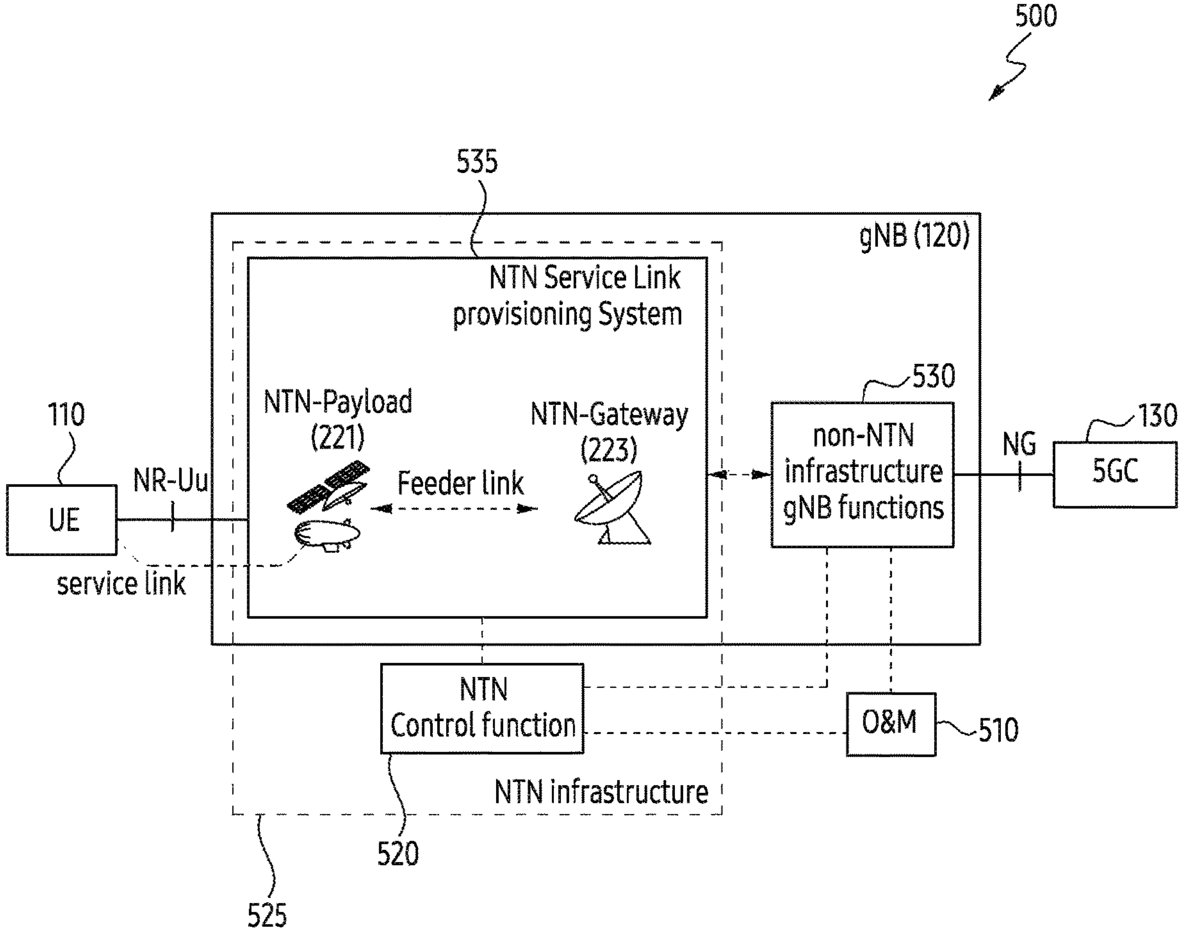
FIG. 5 illustrates an example of implementing an NTN according to an embodiment.

FIG. 5 illustrates an example of implementing an NTN according to an embodiment.

Referring to FIG. 5, an NTN 500 may include an NTN payload 221 and an NTN gateway 223 as a gNB 120. The NTN payload 221 may be mounted on a spacecraft (or airline) vehicle and provide structure, power, command, telemetry, posture control to satellites (corresponding HAPS), suitable thermal environment, and radiation shielding.

For operation of the NTN 500, operation and maintenance (O&M) 510 may provide one or more parameters associated with the NTN 500 to the gNB 120. The O&M 510 may control an NTN control function 520 and a non-NTN infrastructure gNB function 530.

The NTN control function 520 may control a spacecraft (or airline) vehicle as well as a radio resource of the NTN infrastructure 525 (the NTN payload 221 and the NTN gateway 223). In addition, the NTN control function 520 may provide control data (e.g., ephemeris information) to the non-NTN infrastructure gNB function 530.

The gNB 120 may be subdivided into the non-NTN infrastructure gNB function 530 and an NTN service link provisioning system 535. The NTN infrastructure 525 may be subdivided into the NTN control function 520 and the NTN service link provisioning system 535. The NTN service link provisioning system 535 may configured with one or more NTN payloads (e.g., the NTN payload 221) and an NTN gateway (e.g., the NTN gateway 223). The NTN service link provisioning system 535 may map an NR-Uu radio protocol to a radio resource (e.g., beam, channel, Tx power) of the NTN infrastructure 525.

The operation and maintenance (O&M) 510 may provide at least the following NTN-related parameters to the gNB 120 for operation.

a) Earth fixed beams: for each beam provided by a given NTN payload:
   - Cell identifier (NG and Uu) mapped to beam
   - Reference position of cell (e.g., center and range of cell)

b) quasi-earth fixed beams: for each beam provided by a given NTN payload:
   - Cell identifier (NG and Uu) and time windows mapped to beam;
   - Reference position of cell/beam (e.g., center and range of cell)
   - Time window (feeder link, service link) of consecutive switch-over
   - Identifier and time window of all satellites and NTN gateways that provide services c) Earth moving beams: for each beam provided by a given NTN payload:
   - Mapping information on fixed geographic area reported to NG and Uu cell identifier mapped to the beam, information on movement of foot-print of the beam on Earth
   - Elevation for NTN payload;
   - Consecutive service schedule of NTN-Gateways/gNBs;
   - Consecutive switch-over schedule (feeder link, service link)

Figure 6:
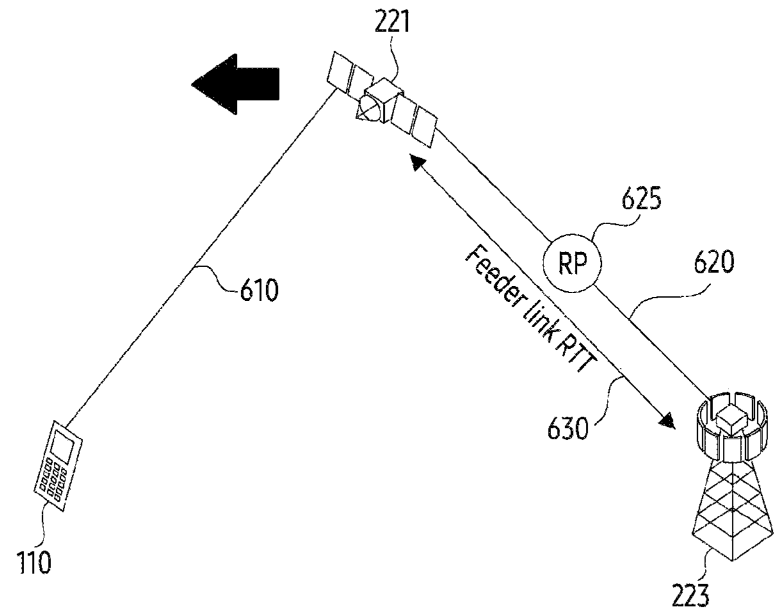
FIG. 6 illustrates an example of movement of a satellite and movement of a terminal in an NTN according to an embodiment.

FIG. 6 illustrates an example of movement of a satellite and movement of a terminal in an NTN according to an embodiment. The satellite exemplifies an NTN payload 221, and the terminal exemplifies a UE 110.

Referring to FIG. 6, the UE 110 may be connected to the NTN payload 221 through a service link 610. The NTN payload 221 may be connected to the NTN gateway 223 through a feeder link 620. An offset corresponding to an RTT 630 between a reference point (RP) 625 and the NTN payload 221 may correspond to a common TA. An offset corresponding to an RTT 630 between the RP 625 and the UE 110 via the NTN payload 221 may be referred to as TTA.

The NTN payload 221 is flying in a certain direction. As the NTN payload 221 moves in the certain direction, the NTN payload 221 may become close to the UE 110. The NTN payload 221 may be connected to another terminal, which is the UE, through another service link. However, as the NTN payload 221 moves in the certain direction, the NTN payload 221 may move away from the UE. Hereinafter, for convenience of explanation, as the NTN payload 221 moves, a terminal that becomes closer may be referred to as a downstream UE, and a terminal that moves away may be referred to as an upstream UE.

Figure 7:
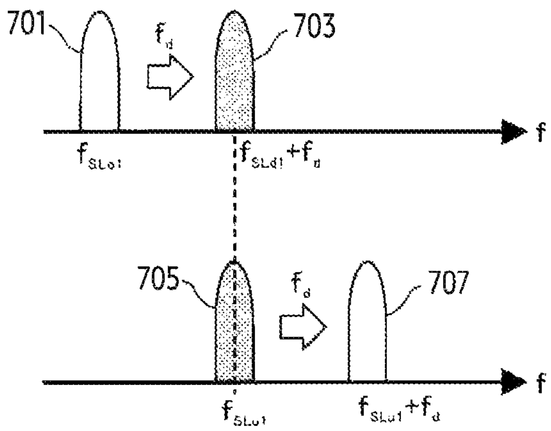
FIGS. 7 and 8 are diagrams for explaining a Doppler shift in an NTN according to an embodiment.
Figure 8:
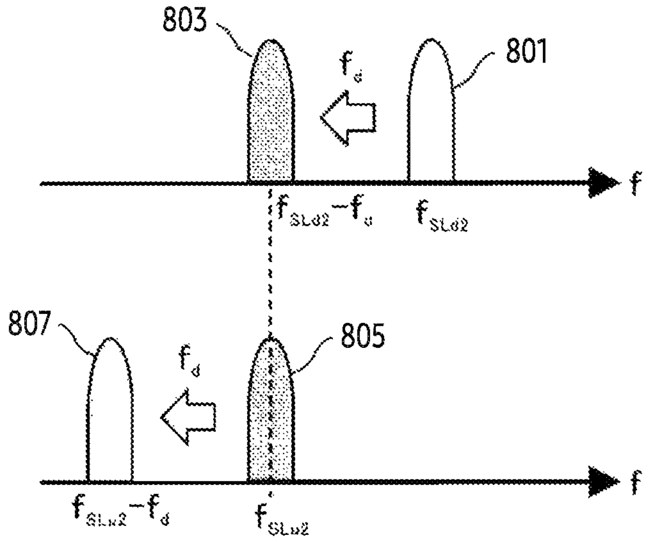

FIGS. 7 and 8 are diagrams for explaining a Doppler shift in an NTN according to an embodiment. In FIG. 7, a relationship between the UE 110, which is a downstream UE, and an NTN payload 221 is illustrated. In FIG. 8, a relationship between the UE, which is an upstream UE, and the NTN payload 221 is illustrated.

Referring to FIG. 7, the NTN payload 221 may transmit a downlink transmission signal 701 of a frequency $f_{SLd1}$ to the UE 110 on a service link. Due to Doppler phenomenon, a frequency of a downlink reception signal 703 received in the UE 110 may be shifted by Doppler shift $f_d$ toward a high frequency side. The UE 110 may receive the downlink reception signal 703 of a frequency $f'_{SLd1}(=f'_{SLd1}+f_d)$. Meanwhile, in an uplink from the UE 110, the UE 110 may transmit an uplink transmission signal 705 of a frequency $f'_{SLu1}(=f_{SLd1}+f_d)$ based on a frequency $f_{SLd1}$ of the downlink reception signal 703. In addition, due to the Doppler phenomenon, the NTN payload 221 may receive from the UE 110, an uplink reception signal 707 of a frequency $f'_{SLu1}$ $(=f_{SLd1}+f_d)$ in which a frequency is shifted by Doppler shift $f_d$ toward the high frequency side. As a result, substantially, a frequency shift of nearly twice the downlink may occur in the service link.

Referring to FIG. 8, the NTN payload 221 may transmit a downlink transmission signal 801 of frequency $f_{SLd2}$ to the UE 110 on a service link. Due to Doppler phenomenon, a frequency of a downlink reception signal 803 received in the UE 110 may be shifted by Doppler shift $f_d$ toward a low frequency side. The UE 110 may receive the downlink reception signal 803 of a frequency $f'_{SLd2}(=f'_{SLd2}-f_d)$. Meanwhile, in an uplink from the UE 110, the UE 110 may transmit an uplink transmission signal 805 of a frequency $f'_{SLu2}(=f'_{SLd2}-f_d)$ based on a frequency $f_{SLd2}$ of the downlink reception signal 803. In addition, due to the Doppler phenomenon, the NTN payload 221 may receive from the UE 110, an uplink reception signal 807 of a frequency $f'_{SLu2}$ $(=f'_{SLu2}-f_d)$ in which a frequency is shifted by Doppler shift $f_d$ toward the high frequency side. As a result, substantially, a frequency shift of nearly twice the downlink may occur in the service link.

As described in FIGS. 7 and 8, a communication frequency recognized by a transmitting end and a receiving end may vary according to movement of the NTN payload 221. In case that a movement direction of the UE 110 and a movement direction of the NTN payload 221 are different in a situation (e.g., vehicle, train, V2X) where the UE 110 moves, a relative movement speed may be higher. In general, a UE of a mobile communication system may correct the Doppler shift by using a reference signal from a base station, and the like, and by using a frequency shifted by the Doppler phenomenon as a reference of a new frequency. However, in case that the Doppler shift is greater than a threshold range due to increase of the relative speed, the UE cannot fully correct the Doppler shift. In other words, the Doppler shift in a frequency of a received signal occurred by the Doppler phenomenon becomes greater than a correctable range, thereby deteriorating communication quality.

According to the embodiments of the present disclosure, in order to solve the above-described problem, the UE 110 (hereinafter, as upstream UE) and af network (e.g., the NTN payload 221 and the NTN gateway 223) may compensate for the Doppler shift and share the compensated Doppler shift information. According to an embodiment, the UE 110 may transmit information on pre-compensated Doppler shift to a network end, which is the NTN payload 221 and the NTN gateway 223. In addition, according to an embodiment, the UE 110 may receive information on the Doppler shift compensated or used for compensation on a network side from the NTN payload 221. Hereinafter, detailed signaling is described with reference to FIGS. 9 to 10.

In case of a serving cell, a network may broadcast ephemeris information and common TA parameters. The UE 110 is required to have a valid GNSS position, satellite ephemeris, and the common TA before connecting to an NTN cell. To achieve synchronization, before and during connection to the NTN cell, the UE may calculate service link RTT based on the GNSS position and satellite ephemeris, and automatically compensate for the TTA in advance.

The UE 110 may calculate frequency Doppler shift in consideration of a position of the UE 110 and the satellite ephemeris. In case that the UE 110 does not have the valid global navigation satellite system (GNSS) position and/or the valid satellite ephemeris, the UE 110 may not communicate with the network until having both the valid GNSS location and the valid satellite ephemeris. In a connected mode, the UE 110 should be able to continuously update timing advance (TA) and frequency pre-compensation. According to an embodiment, the UE 110 may be configured to report the TA during a random access procedure or in the connection mode. During the random access procedure or in the connection mode, the UE 110 may be configured to report frequency pre-compensation information.

Figure 9:
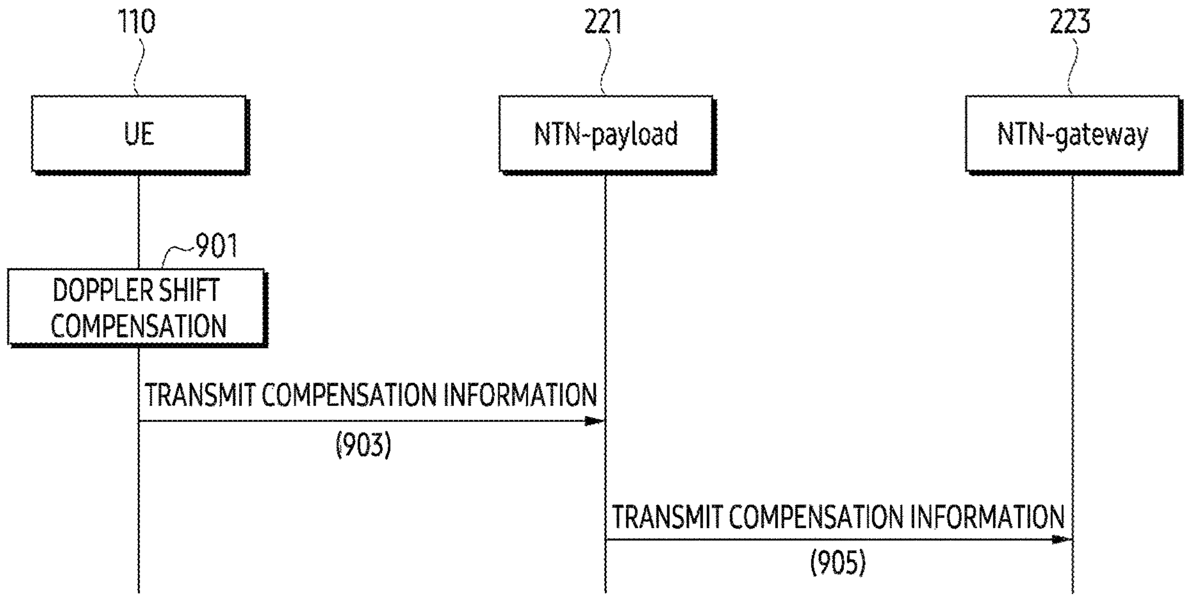
FIG. 9 illustrates an example of reporting of Doppler shift in an NTN according to an embodiment.

FIG. 9 illustrates an example of reporting of Doppler shift in an NTN according to an embodiment.

Referring to FIG. 9, in operation 901, the UE 110 may compensate for Doppler shift. The Doppler shift refers to movement of a signal frequency due to movement of a transmitter, a receiver, or both. In other words, the UE 110 may compensate for a frequency of a signal that varies due to movement of the NTN payload 221 or movement of the UE 110. As described above in FIGS. 7 and 8, Doppler on a signal received by the UE 110 from the NTN payload 221 is affected by the movement of the NTN payload 221 and/or the movement of the UE 110. For example, at a nominal carrier frequency, the NTN payload 221, which is a signal received by the satellite, is affected by a Doppler signal. The Doppler shift F may be calculated based on the following equation.

$$F=Fo*V*\cos(\theta)/c \quad \text{[Equation 1]}$$

Here, 'Fo' is the nominal carrier frequency, 'v' is a UE speed, and 'θ' is an angle between a moving direction and a communication direction. The communication direction refers to a direction of the NTN payload 221 in the UE 110. 'c' indicates a speed of light.

The UE 110 may generate compensation information based on the Doppler shift. Compensation performed in the UE 110 may correspond to pre-compensation. The compensation information may include various information on the pre-compensation performed in the UE 110. According to an embodiment, the compensation information may include information on a Doppler shift value. The Doppler shift value refers to a value (e.g., $f_d$ of FIGS. 7 and 8) in which a frequency is shifted in a frequency domain. In addition, according to an embodiment, the compensation information may include information on a Doppler rate. The Doppler rate indicates Doppler movement during a specified time, and may be referred to as a Doppler variation rate. The Doppler shift and the Doppler rate may vary according to a relative speed of the NTN payload 221, a relative speed of the UE 110, and a carrier frequency. In addition, according to an embodiment, the compensation information may include information on the carrier frequency on which the Doppler shift is performed. By explicitly including the carrier frequency, the UE 110 may inform a network of the pre-compensation performed in the UE 110. For example, the UE 110 may transmit the compensated frequency information. In addition, for example, the UE 110 may transmit information on the Doppler shift value and the carrier frequency before compensation together. In addition, according to an embodiment, the compensation information may include speed information. For example, the UE 110 may include a relative speed calculated based on satellite ephemeris information of the NTN payload 221 in the compensation information.

In operation 903, the UE 110 may transmit compensation information to the NTN payload 221. In operation 905, the NTN payload 221 may transmit compensation information to the NTN gateway 223. In FIG. 9, the operation 903 and the operation 905 are described separately, but the two operations may be understood as a series of operations. In other words, the UE 110 may transmit compensation information to the network through the NTN payload 221 and the NTN gateway 223.

[Transmission Method]

In some embodiments, the UE 110 may transmit the compensation information through a random access procedure. The UE 110 may initiate the random access procedure for the Doppler shift. In perspective of the UE 110, the random access procedure may include a random access preamble transmission and a random access response reception. The UE 110 may transmit the compensation information to the network through the random access preamble transmission.

According to an embodiment, a sequence for generating a random access preamble may indicate the Doppler shift value. In a set of preambles configured through a radio resource control (RRC) signaling, a specific preamble sequence defined for use in the Doppler shift may be identified. A value of the preamble sequence may depend on the Doppler shift value. For example, in case that an index for the preamble sequence is 1, the Doppler shift value may be about −707 hertz (Hz). In addition, for example, in case that the index for the preamble sequence is 2, the Doppler shift value may be about −1414 Hz.

According to an embodiment, a time-frequency resource in which the random access preamble is transmitted, that is a physical random access channel (PRACH) occasion, may indicate the Doppler shift value. Each of a plurality of PRACH occasions may be associated with a specific Doppler shift value. A relationship between the PRACH occasions and predefined Doppler shift values may be established through the RRC signaling. An index of the PRACH occasion may be dependent on the Doppler shift value. For example, in case that the index of the PRACH occasion is 3, the Doppler shift value may be about 2.25 hertz (Hz). In addition, for example, in case that the index of PRACH occasion is 4, the Doppler shift value may be about 22.5 Hz.

According to an embodiment, a combination of the PRACH occasion and a sequence in which the random access preamble is transmitted may indicate the Doppler shift value. For example, the PRACH occasion may indicate a group of Doppler shift values, and the sequence may indicate a specific Doppler shift value within the group. In addition, for example, the sequence may indicate a group of Doppler shift values, and the PRACH occasion may indicate a specific Doppler shift value within the group.

In some other embodiments, the UE 110 may transmit compensation information through a control signaling. According to an embodiment, the UE 110 may transmit compensation information through a separately defined physical layer signaling. For example, at least part of the compensation information may be included as a component of channel state information (CSI). The UE 110 may transmit the compensation information to a base station end (e.g., the gNB 120, the network (the NTN payload 221 and the NTN gateway 223)) through the physical uplink control channel (PUCCH).

According to an embodiment, the UE 110 may transmit the compensation information through a separately defined MAC control element (CE). The MAC CE including the compensation information may be identified by a MAC sub header having LCID. The MAC CE including the compensation information may have a fixed size and may be composed of one or more octets. In order to transmit the MAC CE, two RRC parameters may be additionally defined. According to an embodiment, a frequency threshold may be configured for the UE 110. In case that a difference between a previously reported frequency compensation value (i.e., the Doppler shift value) and a current frequency compensation value exceeds the frequency threshold, a transmission of the MAC CE may be triggered. In addition, according to an embodiment, a compensation scheduling request (SR) may be configured for the UE 110. If there is no uplink resource (e.g., a UL-shared channel (SCH) resource) for reporting, the UE 110 may trigger the scheduling request in case that the compensation SR is configured. According to an additional embodiment, the MAC CE may be used together for timing advance (TA) reporting. A current standard separately defines a timing advance report (TAR) MAC CE, but a TA value to be included in the TAR MAC CE may be included in the MAC CE and transmitted together.

[Reporting Configuration]

In order to report the compensation information of the UE 110, the base station end (e.g., the gNB 120, the network (the NTN payload 221, and the NTN gateway 223)) may transmit configuration information for reporting to the UE 110 through the RRC signaling. According to an embodiment, an RRC configuration message for reporting the compensation information may be defined. The RRC configuration message may include time domain action information for the compensation information of the Doppler shift, index information for the Doppler shift value, and default parameters to be applied when calculating Doppler. Time domain action information may indicate whether the report is periodic, semi-persistent, or aperiodic. In case that the report is periodic or semi-persistent, the time domain action information may further include information on a period. The index information may indicate a Doppler shift value. For example, various Doppler shift values are divided into specified ranges, and each range and index may be related. Alternatively, for another example, the Doppler shift value is represented in a form of a ratio (e.g., 1, ½, ¼, ⅛, 1/16) for a single subcarrier, and a value of each ratio may be associated with an index. The index information may include information for indicating the association. Basic parameters to be applied may include a parameter associated with movement of a satellite (i.e., the NTN payload 221) or a parameter associated with a basic channel model for a service link between the UE 110 and the NTN payload 221.

Figure 10:
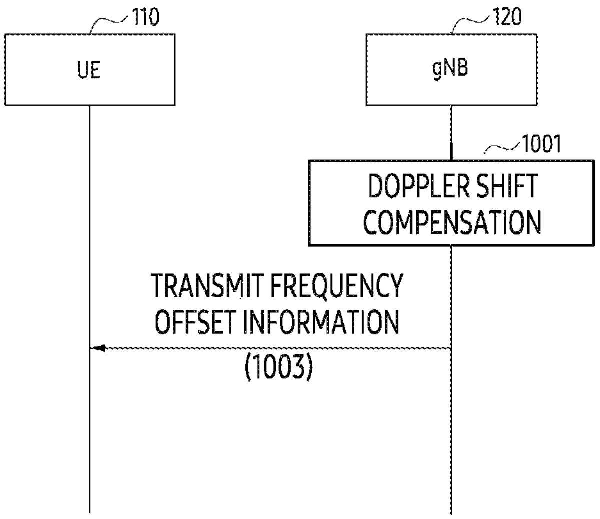
FIG. 10 illustrates an example of configuration a frequency offset in an NTN according to an embodiment.

FIG. 10 illustrates an example of configuration a frequency offset in an NTN according to an embodiment. In case that a compensation of a frequency offset is performed by each network (e.g., the gNB 120) in uplink and/or downlink, indication of the frequency offset value compensated by the network may also be supported. For the gNB 120, the description of FIGS. 2 to 5 may be referred. In FIG. 10, the gNB 120 illustrates a network base station end, but the gNB 120 may be replaced with an eNB in case that an access network corresponds to E-UTRAN.

Referring to FIG. 10, in operation 1001, the gNB 120 may compensate for the Doppler shift. The gNB 120 may compensate for a frequency of a signal that varies due to movement of the NTN payload 221 or movement of the UE 110. As described above in FIGS. 7 and 8, Doppler on a signal received by the UE 110 from the NTN payload 221 is affected by the movement of the NTN payload 221 and/or the movement of the UE 110. If it is difficult to sufficiently compensate for an influence due to the Doppler shift with pre-compensation on the UE 110 side, the gNB 120 may compensate for the influence of the Doppler shift. The compensation performed in the gNB 120 may correspond to post-compensation.

The gNB 120 may generate frequency offset information based on the Doppler shift. According to an embodiment, compensation information may include information on a Doppler shift value. According to an embodiment, the compensation information may include information on a Doppler rate. According to an embodiment, the compensation information may include information on a carrier frequency on which Doppler shift is performed.

The gNB 120 may generate frequency offset information for each designated unit. According to an embodiment, the gNB 120 may generate frequency offset information for each cell. This is because when referring to Equation 1, the carrier frequency is defined for each cell. The gNB 120 may associate frequency offset information with a cell index (e.g., $C_i$, 'i' is an index number). In addition, according to an embodiment, the gNB 120 may generate frequency offset information for each BWP. In case of performing communication, only one BWP may be activated in UL or DL. Since each BWP has a center frequency, the influence of the Doppler shift may be dependent on the BWP when referring to Equation 1. The gNB 120 may associate the frequency offset information with BWP ID. For example, the BWP ID of initial BWP may be '0'. In addition, according to an embodiment, the gNB 120 may generate frequency offset information for each beam. A wireless communication module of the gNB 120 may be located in the NTN payload 221. A link between the NTN payload 221 and the UE 110, that is a length and a direction of a service link, depends on a serving beam (e.g., a synchronization signal block (SSB) resource indicator (SSBRI) and a CSI-RS indicator (CRI)). Referring to Equation 1, an angle (é) between a moving direction and a link may depend on directivity of the serving beam. The gNB 120 may associate frequency offset information with beam information.

In operation 1003, the gNB 120 may transmit frequency offset information to the UE 110. The gNB 120 may transmit frequency offset information to the UE 110 in various ways. According to an embodiment, the gNB 120 may transmit frequency offset information to the UE 110 through an RRC message. In addition, according to an embodiment, the gNB 120 may transmit the frequency offset information to the UE 110 through MAC CE. In addition, according to an embodiment, the gNB 120 may transmit the frequency offset information to the UE 110 through downlink control information (DCI). In addition, according to an embodiment, the frequency offset information may be indicated based on two control signaling rather than a single signaling. For example, a range of the frequency offset information may be configured through the RRC message, and the MAC CE or the DCI may be used to indicate code points within the range.

Although an operation of the gNB 120 is described in FIG. 10, the operation of the gNB 120 may include one or more operations. For example, the operation of the gNB 120 may include compensation of the Doppler shift and a transmission procedure of frequency offset information between the NTN payload 221 and the NTN gateway 223. In addition, for example, an entity that determines a frequency offset according to the compensation of the Doppler shift and an entity that directly transmits compensation information to the UE 110 may be distinguished within an NTN system (e.g., the NTN service link provisioning system 535).

Figure 11A:
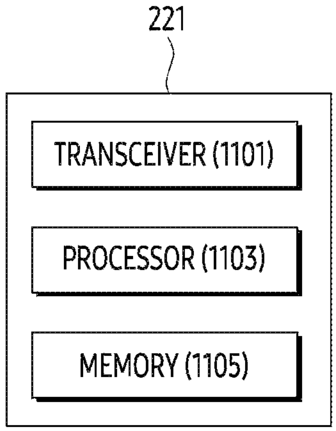
FIG. 11A illustrates components of an NTN payload according to an embodiment.

FIG. 11A illustrates components of an NTN payload according to an embodiment. The NTN payload exemplifies the NTN payload 221. Terms such as ' . . . unit' and ' . . . er' used below refer to units that process at least one function or operation, which may be implemented as hardware or software, or a combination of hardware and software.

Referring to FIG. 11A, the NTN payload 221 may include a transceiver 1101, a processor 1103, and a memory 1105.

The transceiver 1101 performs functions for transmitting and receiving a signal through a wireless channel. For example, the transceiver 1101 up-converts a baseband signal into an RF band signal and transmits it through an antenna, and down-converts the RF band signal received through the antenna into a baseband signal. For example, the transceiver 1101 may include a transmission filter, a reception filter, an amplifier, a mixer, an oscillator, a DAC, an ADC, and the like.

The transceiver 1101 may include a plurality of transmission/reception paths. Furthermore, the transceiver 1101 may include an antenna unit. The transceiver 1101 may include at least one antenna array composed of a plurality of antenna elements. In terms of hardware, the transceiver 1101 may be configured with a digital circuit and an analog circuit (e.g., a radio frequency integrated circuit (RFIC)). Herein, the digital circuit and the analog circuit may be implemented as one package. In addition, the transceiver 1101 may include a plurality of RF chains. The transceiver 1101 may perform beamforming. In order to give directionality according to the configuration of the processor 1103 to a signal intended to transmit and receive, the transceiver 1101 may apply a beamforming weight to the signal. According to an embodiment, the transceiver 1101 may include a radio frequency (RF) block (or RF unit).

The transceiver 1101 may transmit and receive a signal on a radio access network. For example, the transceiver 1101 may transmit a downlink signal. The downlink signal may include a synchronization signal (SS), a reference signal (RS) (e.g., a cell-specific reference signal (CRS), demodulation (DM)-RS), system information (e.g. MIB, SIB, remaining system information (RMSI), other system information (OSI)), a configuration message, control information, or downlink data. In addition, for example, the transceiver 1101 may receive an uplink signal. The uplink signal may include a random access-related signal (e.g., random access preamble (RAP) (or message 1 (Msg1)), message 3 (Msg3)), a reference signal (e.g., sounding reference signal (SRS), DM-RS), or power headroom report (PHR). In FIG. 11A, only the transceiver 1101 is illustrated, but according to another implementation, the NTN payload 221 may include two or more RF transceiver.

The processor 1103 controls overall operations of the NTN payload 221. The processor 1103 may be referred to as a control unit. For example, the processor 1103 transmits and receives a signal through the transceiver 1101. In addition, the processor 1103 writes and reads data into the memory 1105. In addition, the processor 1103 may perform functions of protocol stack required by communication standard. In FIG. 11A, only the processor 1103 is illustrated, but according to another implementation, the NTN payload 221 may include two or more processors. The processor 1103 is an instruction set or a code stored in the memory 1105, and may be instruction/code that is at least temporarily resided in the processor 1103 or a storage space where instruction/code are stored, or may be part of a circuit configuring the processor 1103. In addition, the processor 1103 may include various modules for performing communication. The processor 1103 may control the NTN payload 221 to perform operations according to embodiments.

The memory 1105 stores data such as a basic program, an application program, and configuration information for the operation of the NTN payload 221. The memory 1105 may be referred to as a storage unit. The memory 1105 may be configured as a volatile memory, a nonvolatile memory, or a combination of the volatile memory and the nonvolatile memory. In addition, the memory 1105 provides stored data according to a request of the processor 1103. According to an embodiment, the memory 1105 may include a memory for a condition, an instruction, or a configuration value associated with an SRS transmission scheme.

Figure 11B:
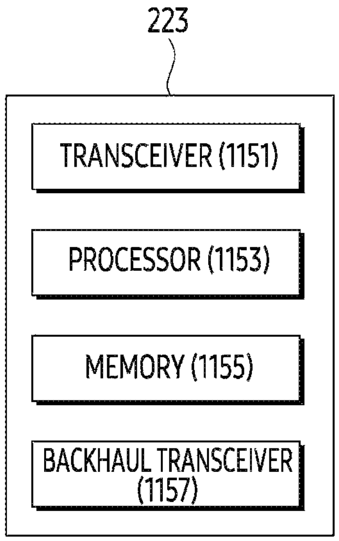
FIG. 11B illustrates components of an NTN gateway according to an embodiment.

FIG. 11B illustrates components of an NTN gateway according to an embodiment. The NTN gateway exemplifies the NTN gateway 223. Terms such as ' . . . unit' and ' . . . er' used below refer to units that process at least one function or operation, which may be implemented as hardware or software, or a combination of hardware and software.

Referring to FIG. 11B, the NTN gateway 223 may include a transceiver 1151, a processor 1153, a memory 1155, and a backhaul transceiver 1157.

The transceiver 1151 may perform functions for transmitting and receiving a signal in a wired communication environment. The transceiver 1151 may include a wired interface to control a direct connection between devices through a transmission medium (e.g., copper wire, optical fiber). For example, the transceiver 1151 may transmit an electrical signal to another device through copper wire or perform conversion between an electrical signal and an optical signal. The NTN gateway 223 may communicate with the NTN payload 221 through the transceiver 1151. The NTN gateway 223 may be connected to a core network or a CU in a distributed deployment through the transceiver 1151.

The transceiver 1151 may perform functions for transmitting and receiving a signal in a wireless communication environment. For example, the transceiver 1151 may perform a conversion function between a baseband signal and a bit string according to a physical layer standard of a system. For example, when transmitting data, the transceiver 1151 generates complex-valued symbols by encoding and modulating a transmission bit string. In addition, when receiving data, the transceiver 1151 restores a reception bit string by demodulating and decoding the baseband signal. In addition, the transceiver 1151 may include a plurality of transmission/reception paths. In addition, according to an embodiment, the transceiver 1151 may be connected to a core network or other nodes (e.g., integrated access backhaul (IAB)).

As described above, the transceiver 1151 transmits and receives a signal. Accordingly, all or part of the transceiver 1151 may be referred to as a 'communication unit', 'transmission unit', 'reception unit', or 'transmission unit'. In addition, in the following description, a transmission and reception performed through a wireless channel includes meaning that processing as described above is performed by the transceiver 1151.

The processor 1153 controls overall operations of the NTN gateway 223. The processor 1153 may be referred to as a control unit. For example, the processor 1153 transmits and receives a signal through the transceiver 1151 (or through the backhaul transceiver 1157). In addition, the processor 1153 writes and reads data into the memory 1155. In addition, the processor 1153 may perform functions of protocol stack required by communication standard. In FIG. 11B, only the processor 1153 is illustrated, but according to another implementation, the NTN gateway 223 may include two or more processors.

The memory 1155 stores data such as a basic program, an application program, and configuration information for the operation of the NTN gateway 223. The memory 1155 may be referred to as a storage unit. The memory 1155 may be configured as a volatile memory, a nonvolatile memory, or a combination of the volatile memory and the nonvolatile memory. In addition, the memory 1155 provides stored data according to a request of the processor 1153.

The NTN gateway 223 may further include a backhaul transceiver 1157 for connecting with a core network or another base station. The backhaul transceiver 1157 provides an interface for performing communication with other nodes in a network. In other words, the backhaul transceiver 1157 converts a bit string transmitted from abase station to another node, for example, another access node, another base station, higher node, core network, and the like, into a physical signal, and converts a physical signal received from another node into a bit string.

Figure 12:
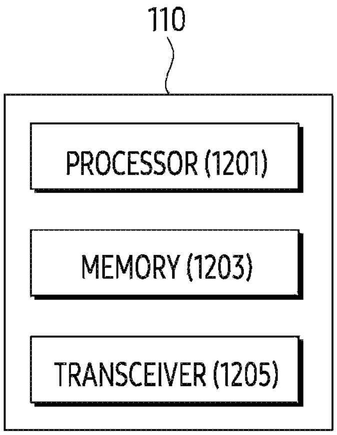
FIG. 12 illustrates components of a terminal according to an embodiment.

FIG. 12 illustrates components of a terminal according to an embodiment. The terminal exemplifies the UE 110. The UE 110 may perform a connection to a gNB (e.g., the gNB 120) that provides NR access through NTN.

Referring to FIG. 12, the UE 110 may include at least one processor 1201, at least one memory 1203, and at least one transceiver 1205. Hereinafter, component is described in singular, but implementation of a plurality of components or sub-components is not excluded.

The processor 1201 controls overall operations of the UE 110. For example, the processor 1201 writes and reads data into the memory 1203. For example, the processor 1201 transmits and receives a signal through the transceiver 1205. Although one processor is illustrated in FIG. 12, embodiments of the present disclosure are not limited thereto. The UE 110 may include at least one processor to perform embodiments of the present disclosure. The processor 1201 may be referred to as a control unit or control means. According to embodiments, the processor 1201 may control the UE 110 to perform at least one of operations or methods according to the embodiments of the present disclosure.

The memory 1203 may store data such as a basic program, an application program, and configuration information for an operation of the UE 110. The memory 1203 may store various data used by at least one component (e.g., the transceiver 1205 and the processor 1201). The data may include, for example, input data or output data for software and related commands. The memory 1203 may be configured as a volatile memory, a nonvolatile memory, or a combination of the volatile memory and the nonvolatile memory. In addition, the memory 1203 may provide stored data according to a request of the processor 1201.

The transceiver 1205 performs functions for transmitting and receiving a signal through a wireless channel. For example, the transceiver 1205 performs a conversion function between a baseband signal and a bit string according to a physical layer standard of a system. For example, when transmitting data, the transceiver 1205 generates complex-valued symbols by encoding and modulating a transmission bit string. In addition, when receiving data, the transceiver 1205 restores a reception bit string by demodulating and decoding a baseband signal. the transceiver 1101 up-converts a baseband signal into an RF band signal and transmits it through an antenna, and down-converts the RF band signal received through the antenna into a baseband signal.

To this end, the transceiver 1205 may include a transmission filter, a reception filter, an amplifier, a mixer, an oscillator, a digital to analog converter (DAC), an analog to digital converter (ADC), and the like. In addition, the transceiver 1205 may include a plurality of transmission/reception paths. Furthermore, the transceiver 1205 may include at least one antenna array composed of a plurality of antenna elements. In terms of hardware, the transceiver 1205 may be composed of a digital unit and an analog unit, and the analog unit may be composed of a plurality of sub-units according to operating power, operating frequency, and the like.

As described above, the transceiver 1205 transmits and receives a signal. Accordingly, the transceiver 1205 may be referred to as a 'transmission unit', a 'reception unit', or a 'transmission/reception unit'. In addition, in the following description, transmission and reception performed through a wireless channel, a backhaul network, optical cable, Ethernet, and other wired paths includes meaning that processing as described above is performed by the transceiver 1205. According to an embodiment, the transceiver 1205 may provide an interface for performing communication with other nodes in a network. In other words, the transceiver 1205 converts a bit string transmitted from the UE 110 to another node, for example, another access node, another base station, higher node, core network, and the like, into a physical signal, and converts a physical signal received from another node into a bit string.

In embodiments, a method performed by a user equipment (UE) may comprise performing a compensation for doppler shift based on ephemeris information for non-terrestrial network (NTN) device and position information of the UE. The method may comprise transmitting a message including compensation information to a network node through the NTN device based on the compensation. The compensation information may indicate at least one of a frequency shift value according to the doppler shift or a doppler shift change rate indicating a change rate of a frequency shift value per unit time. The NTN device may comprise a satellite that moves based on the ephemeris information.

According to an embodiment, the compensation information may be transmitted through a medium access control (MAC) control element (CE). A transmission of the MAC CE may be triggered in case that a difference between a previously reported compensation value and a current compensation value is greater than a threshold. The threshold may be configured through a radio resource control (RRC) signaling.

According to an embodiment, the compensation information may be transmitted by a transmission of a random access preamble of a random access procedure. At least one of a sequence of the random access preamble or a physical random access channel (PRACH) occasion in which the random access preamble is transmitted may indicate the frequency shift value.

According to an embodiment, the method may comprise receiving, from the network node through the NTN device, information on a frequency offset. The frequency offset may be associated with a compensation in a network for the doppler shift. The frequency offset may be associated with at least one of a cell, bandwidth part (BWP) identifier (ID), or a beam identifier.

According to an embodiment, the method may comprise receiving, from the network node through the NTN device, a radio resource control (RRC) message for indicating a range for the frequency offset. The information may comprise a medium access control (MAC) control element (CE) or downlink control information (DCI) for indicating the frequency offset within the range.

In embodiments, a method performed by a network node may comprise receiving, from a non-terrestrial network (NTN) device through a user equipment (UE), a message including compensation information for doppler shift. The method may comprise identifying at least one of a frequency shift value according to the doppler shift or a doppler shift change rate indicating a change rate of a frequency shift value per unit time, from the compensation information. The compensation information may be associated with ephemeris information for the non-terrestrial network (NTN) device and position information of the UE.

According to an embodiment, the compensation information may be received through a medium access control (MAC) control element (CE). A transmission of the MAC CE may be triggered in case that a difference between a previously reported compensation value and a current compensation value is greater than a threshold. The threshold may be configured through a radio resource control (RRC) signaling.

According to an embodiment, the compensation information may be received by a transmission of a random access preamble of a random access procedure. At least one of a sequence of the random access preamble or a physical random access channel (PRACH) occasion in which the random access preamble is transmitted may indicate the frequency shift value.

According to an embodiment, the method may comprise transmitting, to the UE through the NTN device, information on a frequency offset. The frequency offset may be associated with a compensation in a network for the doppler shift. The frequency offset may be associated with at least one of a cell, bandwidth part (BWP) identifier (ID), or a beam identifier.

According to an embodiment, the method may comprise transmitting, to the UE through the NTN device, a radio resource control (RRC) message for indicating a range for the frequency offset. The information may comprise a medium access control (MAC) control element (CE) or downlink control information (DCI) for indicating the frequency offset within the range.

In embodiments, a device of a user equipment (UE) may comprise at least one transceiver and at least one processor coupled to the at least one transceiver. The at least one processor may be configured to perform a compensation for doppler shift based on ephemeris information for non-terrestrial network (NTN) device and position information of the UE. The at least one processor may be configured to transmit a message including compensation information to a network node through the NTN device based on the compensation. The compensation information may indicate at least one of a frequency shift value according to the doppler shift or a doppler shift change rate indicating a change rate of a frequency shift value per unit time. The NTN device may comprise a satellite that moves based on the ephemeris information.

According to an embodiment, the compensation information may be transmitted through a medium access control (MAC) control element (CE). A transmission of the MAC CE may be triggered in case that a difference between a previously reported compensation value and a current compensation value is greater than a threshold. The threshold may be configured through a radio resource control (RRC) signaling.

According to an embodiment, the compensation information may be transmitted by a transmission of a random access preamble of a random access procedure. At least one of a sequence of the random access preamble or a physical random access channel (PRACH) occasion in which the random access preamble is transmitted may indicate the frequency shift value.

According to an embodiment, the at least one processor may be further configured to receive, from the network node through the NTN device, information on a frequency offset. The frequency offset may be associated with a compensation in a network for the doppler shift. The frequency offset may be associated with at least one of a cell, bandwidth part (BWP) identifier (ID), or a beam identifier.

According to an embodiment, the at least one processor may be further configured to receive, from the network node through the NTN device, a radio resource control (RRC) message for indicating a range for the frequency offset. The information may comprise a medium access control (MAC) control element (CE) or downlink control information (DCI) for indicating the frequency offset within the range.

In embodiments, a device of a network node may comprise at least one transceiver and at least one processor coupled to the at least one transceiver. The at least one processor may be configured to receive, from a non-terrestrial network (NTN) device through a user equipment (UE), a message including compensation information for doppler shift. The at least one processor may be configured to identify at least one of a frequency shift value according to the doppler shift or a doppler shift change rate indicating a change rate of a frequency shift value per unit time, from the compensation information. The compensation information may be associated with ephemeris information for the non-terrestrial network (NTN) device and position information of the UE.

According to an embodiment, the compensation information may be received through a medium access control (MAC) control element (CE). A transmission of the MAC CE may be triggered in case that a difference between a previously reported compensation value and a current compensation value is greater than a threshold. The threshold may be configured through a radio resource control (RRC) signaling.

According to an embodiment, the compensation information may be received by a transmission of a random access preamble of a random access procedure. At least one of a sequence of the random access preamble or a physical random access channel (PRACH) occasion in which the random access preamble is transmitted may indicate the frequency shift value.

According to an embodiment, the at least one processor may be configured to transmit, to the UE through the NTN device, information on a frequency offset. The frequency offset may be associated with a compensation in a network for the doppler shift. The frequency offset may be associated with at least one of a cell, bandwidth part (BWP) identifier (ID), or a beam identifier.

According to an embodiment, the at least one processor may be configured to transmit, to the UE through the NTN device, a radio resource control (RRC) message for indicating a range for the frequency offset. The information may comprise a medium access control (MAC) control element (CE) or downlink control information (DCI) for indicating the frequency offset within the range.

According to embodiments of the present disclosure, effective frequency compensation may be provided by transmitting information on Doppler shift in a non-terrestrial network (NTN). More specifically, as the UE performs pre-compensation and provides compensation information to the network, a network side may identify compensation for the Doppler shift performed at the UE. If necessary, a network node (e.g., the gNB 120) may supplement the pre-compensation through additional compensation and instruct the UE with a changed frequency offset.

Effects obtained in the present disclosure are not limited to those described above effects, and other effects not mentioned herein will be clearly understood by those having ordinary knowledge in the art to which the present disclosure belongs, from the following description.

Methods according to embodiments described in claims or specifications of the present disclosure may be implemented as a form of hardware, software, or a combination of hardware and software.

In case of implementing as software, a computer-readable storage medium for storing one or more programs (software module) may be provided. One or more programs stored in the computer-readable storage medium are configured for execution by one or more processors in an electronic device. One or more programs include instructions that allow the electronic device to execute methods according to embodiments described in claims or specifications of the present disclosure.

Such a program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), another type of optical storage device, or a magnetic cassette. Alternatively, it may be stored in a memory composed of a combination of some or all of them. In addition, a plurality of each configuration memory may be included.

Additionally, a program may be stored in an attachable storage device that may be accessed through a communication network such as the Internet, Intranet, local area network (LAN), wide area network (WAN), or storage area network (SAN), or a combination of them. Such a storage device may be connected to a device performing an embodiment of the present disclosure through an external port. In addition, a separate storage device on the communication network may also access a device that performs embodiment of the present disclosure.

In specific embodiments of the present disclosure described above, an element included in the disclosure are represented in singular or plural numbers according to a specific embodiment presented. However, singular or plural expressions are selected to suit the presented situation for convenience of explanation, the present disclosure is not limited to singular or plural components, and even a component represented in the plural may be composed of a singular number, or a component represented in the singular may be composed of a plural number.

Meanwhile, in the detailed description of the present disclosure, specific embodiments have been described, but of course, various modifications are possible without departing from the scope of the present disclosure.

What is claimed is:

1. A method performed by a user equipment (UE), the method comprising:

performing a compensation for doppler shift based on ephemeris information for non-terrestrial network (NTN) device and position information of the UE;

transmitting a message including compensation information to a network node through the NTN device based on the compensation, wherein the compensation information indicates at least one of a frequency shift value according to the doppler shift or a doppler shift change rate indicating a change rate of a frequency shift value per unit time; and receiving, from the network node through the NTN device, information on a frequency offset related to a compensation in a network for the doppler shift, wherein the frequency offset is associated with at least one of a cell, bandwidth part (BWP) identifier (ID), or a beam identifier, and wherein the NTN device comprises a satellite that moves based on the ephemeris information.

2. The method of claim 1, wherein the compensation information is transmitted through a medium access control (MAC) control element (CE), wherein a transmission of the MAC CE is triggered in case that a difference between a previously reported compensation value and a current compensation value is greater than a threshold, and wherein the threshold is configured through a radio resource control (RRC) signaling.

3. The method of claim 1, wherein the compensation information is transmitted by a transmission of a random access preamble of a random access procedure, and wherein at least one of a sequence of the random access preamble or a physical random access channel (PRACH) occasion in which the random access preamble is transmitted indicates the frequency shift value.

4. The method of claim 1, further comprising:

receiving, from the network node through the NTN device, a radio resource control (RRC) message for indicating a range for the frequency offset, and wherein the information comprises a medium access control (MAC) control element (CE) or downlink control information (DCI) for indicating the frequency offset within the range.

5. A method performed by a network node, the method comprising:

receiving, from a non-terrestrial network (NTN) device through a user equipment (UE), a message including compensation information for doppler shift;

identifying at least one of a frequency shift value according to the doppler shift or a doppler shift change rate indicating a change rate of a frequency shift value per unit time, from the compensation information; and transmitting, to the UE through the NTN device, information on a frequency offset related to a compensation in a network for the doppler shift, wherein the frequency offset is associated with at least one of a cell, bandwidth part (BWP) identifier (ID), or a beam identifier, and wherein the compensation information is associated with ephemeris information for the non-terrestrial network (NTN) device and position information of the UE.

6. The method of claim 5, wherein the compensation information is received through a medium access control (MAC) control element (CE), wherein a transmission of the MAC CE is triggered in case that a difference between a previously reported compensation value and a current compensation value is greater than a threshold, and wherein the threshold is configured through a radio resource control (RRC) signaling.

7. The method of claim 5, wherein the compensation information is received by a transmission of a random access preamble of a random access procedure, and wherein at least one of a sequence of the random access preamble or a physical random access channel (PRACH) occasion in which the random access preamble is transmitted indicates the frequency shift value.

8. The method of claim 5, further comprising:

transmitting, to the UE through the NTN device, a radio resource control (RRC) message for indicating a range for the frequency offset, and wherein the information comprises a medium access control (MAC) control element (CE) or downlink control information (DCI) for indicating the frequency offset within the range.

9. A device of a user equipment (UE), the device comprising:

at least one transceiver; and at least one processor coupled to the at least one transceiver, wherein the at least one processor is configured to:

perform a compensation for doppler shift based on ephemeris information for non-terrestrial network (NTN) device and position information of the UE;

transmit a message including compensation information to a network node through the NTN device based on the compensation, wherein the compensation information indicates at least one of a frequency shift value according to the doppler shift or a doppler shift change rate indicating a change rate of a frequency shift value per unit time; and receive, from the network node through the NTN device, information on a frequency offset related to a compensation in a network for the doppler shift, wherein the frequency offset is associated with at least one of a cell, bandwidth part (BWP) identifier (ID), or a beam identifier, and wherein the NTN device comprises a satellite that moves based on the ephemeris information.

10. The device of claim 9, wherein the compensation information is transmitted through a medium access control (MAC) control element (CE), wherein a transmission of the MAC CE is triggered in case that a difference between a previously reported compensation value and a current compensation value is greater than a threshold, and wherein the threshold is configured through a radio resource control (RRC) signaling.

11. The device of claim 9, wherein the compensation information is transmitted by a transmission of a random access preamble of a random access procedure, and wherein at least one of a sequence of the random access preamble or a physical random access channel (PRACH) occasion in which the random access preamble is transmitted indicates the frequency shift value.

12. The device of claim 11, wherein the at least one processor is further configured to:

receive, from the network node through the NTN device, a radio resource control (RRC) message for indicating a range for the frequency offset, and wherein the information comprises a medium access control (MAC) control element (CE) or downlink control information (DCI) for indicating the frequency offset within the range.

13. A device of a network node, the device comprising:

at least one transceiver; and at least one processor coupled to the at least one transceiver, wherein the at least one processor is configured to:

receive, from a non-terrestrial network (NTN) device through a user equipment (UE), a message including compensation information for doppler shift;

identify at least one of a frequency shift value according to the doppler shift or a doppler shift change rate indicating a change rate of a frequency shift value per unit time, from the compensation information; and transmit, to the UE through the NTN device, information on a frequency offset related to a compensation in a network for the doppler shift, wherein the frequency offset is associated with at least one of a cell, bandwidth part (BWP) identifier (ID), or a beam identifier, and wherein the compensation information is associated with ephemeris information for the non-terrestrial network (NTN) device and position information of the UE.

14. The device of claim 13, wherein the compensation information is received through a medium access control (MAC) control element (CE), wherein a transmission of the MAC CE is triggered in case that a difference between a previously reported compensation value and a current compensation value is greater than a threshold, and wherein the threshold is configured through a radio resource control (RRC) signaling.

15. The device of claim 13, wherein the compensation information is received by a transmission of a random access preamble of a random access procedure, and wherein at least one of a sequence of the random access preamble or a physical random access channel (PRACH) occasion in which the random access preamble is transmitted indicates the frequency shift value.

16. The device of claim 13, wherein the at least one processor is further configured to:

transmit, to the UE through the NTN device, a radio resource control (RRC) message for indicating a range for the frequency offset, and wherein the information comprises a medium access control (MAC) control element (CE) or downlink control information (DCI) for indicating the frequency offset within the range.

* * * * *